United States Patent
Tang et al.

(10) Patent No.: US 11,510,199 B2
(45) Date of Patent: Nov. 22, 2022

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Hai Tang, Guangdong (CN); Huei-Ming Lin, Victoria (AU)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 49 days.

(21) Appl. No.: 16/913,142

(22) Filed: Jun. 26, 2020

(65) Prior Publication Data

US 2020/0337052 A1   Oct. 22, 2020

Related U.S. Application Data

(63) Continuation of application No. PCT/CN2018/106541, filed on Sep. 19, 2018.

(30) Foreign Application Priority Data

Dec. 28, 2017   (CN) ................. PCT/CN2017/119589

(51) Int. Cl.
*H04W 72/04* (2009.01)
*H04W 92/18* (2009.01)
*H04W 84/04* (2009.01)

(52) U.S. Cl.
CPC ...... *H04W 72/0453* (2013.01); *H04W 84/042* (2013.01); *H04W 92/18* (2013.01)

(58) Field of Classification Search
None
See application file for complete search history.

(56) References Cited

U.S. PATENT DOCUMENTS

2013/0223356 A1* 8/2013 Khoshnevis ........ H04W 72/042
370/329
2015/0312923 A1  10/2015 Guo
(Continued)

FOREIGN PATENT DOCUMENTS

CN   102917372 A   2/2013
CN   104145525 A   11/2014
(Continued)

OTHER PUBLICATIONS

The first Office Action of corresponding Chinese application No. 202010996940.6, dated Aug. 26, 2021.
(Continued)

*Primary Examiner* — Saba Tsegaye
(74) *Attorney, Agent, or Firm* — Ladas & Parry LLP (57) ABSTRACT

Embodiments of the present application provide a wireless communication method, a terminal device and a network device. The terminal device transmits data on a second type carrier according to a transmission parameter corresponding to a first carrier system, thereby saving resources and reducing signaling overhead. The method is applied to device to device communication, and the method includes: the terminal device determines, according to configuration information, to transmit data on at least one second type carrier according to the transmission parameter corresponding to at least one first type carrier system, and the configuration information indicates a correspondence between the at least one second type carrier and the at least one first type carrier system, the first type carrier is configured to transmit the transmission parameter over downlink, and the second type carrier is configured to transmit data over sidelink.

20 Claims, 4 Drawing Sheets

(56) References Cited

U.S. PATENT DOCUMENTS

| | | | |
|---|---|---|---|
| 2017/0285177 A1* | 10/2017 | Jin | G01V 3/08 |
| 2017/0303238 A1 | 10/2017 | Fodor et al. | |
| 2018/0167945 A1* | 6/2018 | Cao | H04W 72/04 |
| 2019/0174444 A1* | 6/2019 | Li | H04W 56/0015 |
| 2020/0092685 A1* | 3/2020 | Fehrenbach | H04B 7/2606 |

FOREIGN PATENT DOCUMENTS

| | | |
|---|---|---|
| CN | 105282257 A | 1/2016 |
| CN | 105681439 A | 6/2016 |
| CN | 106233780 A | 12/2016 |
| CN | 106455086 A | 2/2017 |
| CN | 106797534 A | 5/2017 |
| CN | 106961704 A | 7/2017 |
| CN | 107295669 A | 10/2017 |
| CN | 107466115 A | 12/2017 |
| EP | 3442286 A1 | 2/2019 |
| EP | 3461215 A1 | 3/2019 |
| WO | 2016159007 | 10/2016 |
| WO | 2017039735 A1 | 3/2017 |
| WO | 2017214771 A1 | 12/2017 |

OTHER PUBLICATIONS

The EESR of corresponding European application No. 18896874.7, dated Sep. 29, 2020.
Vodafone, 3GPP TSG RAN Meeting #80 RP-181429, New SID: Study on NR V2X, La Jolla, USA, Jun. 11-14, 2018.
The first Office Action of corresponding European application No. 18896874.7, dated May 14, 2021.
The first Office Action of corresponding Indian application No. 202017032236, dated Jul. 7, 2021.
International Search Report(ISR) dated Dec. 12, 2018 for Application No. PCT/CN2018/106541.
International Search Report(ISR) dated Sep. 18, 2018 for Application No. PCT/CN2017/119589.
The second Office Action of corresponding Chinese appiication No. 202010996940.6, dated Dec. 1, 2021.
The third Office Action of corresponding Chinese application No. 202010996940.6, dated Jan. 29, 2022.
The first Office Action of corresponding Singaporean application No. 11202006143V, dated Feb. 8, 2022.
The Notice of Allowance of corresponding Chinese application No. 202010996940.6, dated Mar. 16, 2022.
Heng Hu et al. A Resource Allocation Mechanism Based on Resource Pool in Vehicle-Vehicle Communication form Guangdong Communication Technology, published on Dec. 15, 2016.
ZTE. 3GPP TSG-RAN WG2 Meeting #86; R2-142146; D2D communication resource mode configuration, Seoul, South Korea, May 19-23, 2014.
The Notice of Reasons for Rejection of the parallel JP application No. 2020-535510, dated Sep. 6, 2022.
Ericsson, Clarification to Mapping Between Service Types and V2X Frequencies, R2-1711858, 3GPP TSG-RAN WG2 Meeting #99bis, Prague, Czech Republic, Oct. 9-13, 2017.

* cited by examiner

WIRELESS COMMUNICATION METHOD, TERMINAL DEVICE AND NETWORK DEVICE

The present application is a continuation of International Application No. PCT/CN2018/106541, filed on Sep. 19, 2018, which claims priority to International Application No. PCT/CN2017/119589, filed on Dec. 28, 2017. The disclosures of the aforementioned applications are hereby incorporated by reference in their entireties.

TECHNICAL FIELD

The present application relates to the field of communications, and more particularly, to a wireless communication method, a terminal device and a network device.

BACKGROUND

In Release 14, a terminal device (for example, a vehicle terminal) can perform data transmission with the network device through the Uu carrier on the uplink (Uplink) and data transmission with other terminal through the PC5 carrier on the sidelink (Sidelink). However, at present, the terminal device transmit data on the Uu carrier and the PC5 carrier respectively according to independent transmission parameters, so the transmission parameters for the Uu carrier and the PC5 carrier are required to be configured respectively. As a result, a waste of resources is caused, and there is a lot of signaling overhead, which cannot meet data transmission requirements for Release 15 and subsequent releases.

SUMMARY

The present application provides a wireless communication method, a terminal device and a network device. The terminal device may transmit data on the PC5 carrier according to a transmission parameter corresponding to the Uu carrier system, thereby saving resource and reducing signaling overhead.

In a first aspect, the present application provides a wireless communication method, terminal device and network device, the method includes:

determining, by a terminal device, according to configuration information, to transmit data on at least one second type carrier according to a transmission parameter corresponding to at least one first type carrier system, where the configuration information indicates a correspondence between the at least one second type carrier and the at least one first type carrier system, a first type carrier is configured to transmit the transmission parameter over downlink, and the second type carrier is configured to transmit data over sidelink.

Therefore, in the wireless communication method in the embodiment of the present application, the terminal device determines, according to the configuration information that indicates the correspondence between the at least one second type carrier and the at least one first type carrier system, to transmit data on the at least one second type carrier according to the transmission parameter corresponding to the at least one first type carrier system, thereby saving resources and reducing signaling overhead.

In an implementation form of the first aspect, an attribute of the first type carrier system includes the at least one first type carrier.

In an implementation form of the first aspect, the attribute of the first type carrier system further includes at least one of public land mobile network (PLMN) information, radio access technology (RAT) information, or geographic location information.

In an implementation form of the first aspect, the RAT information is for a long term evolution (LTE) communication network, or for a fifth generation new radio (5G NR) communication network.

In an implementation form of the first aspect, the at least one second type carrier includes a second type carrier X and a second type carrier Y, the at least one first type carrier system includes a first type carrier system Z, and the second type carrier X and the second type carrier Y correspond to the first type carrier system Z;

the determining, by a terminal device, according to configuration information, to transmit data on at least one second type carrier according to a transmission parameter corresponding to at least one first type carrier system, includes:

transmitting, by the terminal device, data on the second type carrier X and the second type carrier Y according to a transmission parameter corresponding to the first type carrier system Z.

In an implementation form of the first aspect, the method further includes:

determining, by the terminal device, whether it is within the coverage of the first type carrier system Z according to at least one of PLMN information, RAT information, or geographic location information.

In an implementation form of the first aspect, the transmitting, by the terminal device, data on the second type carrier X and the second type carrier Y according to a transmission parameter corresponding to the first type carrier system Z, includes:

determining, by the terminal device, that it is within the coverage of the first type carrier system Z;

transmitting, by the terminal device, data on the second type carrier X and the second type carrier Y according to the transmission parameter corresponding to the first type carrier system Z.

In an implementation form of the first aspect, the transmitting, by the terminal device, data on the second type carrier X and the second type carrier Y according to a transmission parameter corresponding to the first type carrier system Z, includes:

determining, by the terminal device, that it is not within the coverage of the first type carrier system Z;

transmitting, by the terminal device, data on the second type carrier X and the second type carrier Y according to a pre-configured transmission parameter for the second type carrier; or, transmitting, by the terminal device, data on the second type carrier X according to a pre-configured transmission parameter for the second type carrier X and on the second type carrier Y according to a pre-configured transmission parameter for the second type carrier Y.

In an implementation form of the first aspect, the at least one second type carrier includes a second type carrier M and a second type carrier N, and the at least one first type carrier system includes a first type carrier system U and a first type carrier system V, the second type carrier M corresponds to the first type carrier system U, and the second type carrier N corresponds to the first type carrier system V;

the determining, by a terminal device, according to configuration information, to transmit data on at least one second type carrier according to a transmission parameter corresponding to at least one first type carrier system, includes:

transmitting, by the terminal device, data on the second type carrier M according to a transmission parameter corresponding to the first type carrier system U, and data on the second type carrier N according to a transmission parameter corresponding to the first type carrier system V.

In an implementation form of the first aspect, the method further includes:

determining, by the terminal device, according to at least one of PLMN information, RAT information, or geographic location information, whether it is within coverage of the first type carrier system U, and whether it is within the coverage of the first type carrier system V.

In an implementation form of the first aspect, transmitting, by the terminal device, data on the second type carrier M according to a transmission parameter corresponding to the first type carrier system U, and transmitting data on the second type carrier N according to a transmission parameter corresponding to the first type carrier system V, includes:

determining, by the terminal device, that it is within the coverage of the first type carrier system U, and is not within the coverage of the first type carrier system V;

transmitting, by the terminal device, data on the second type carrier M according to the transmission parameter corresponding to the first type carrier system U and on the second type carrier N according to a pre-configured transmission parameter for the second type carrier; or, transmitting, by the terminal device, data on the second type carrier N according to a pre-configured transmission parameter for the second type carrier N.

In an implementation form of the first aspect, the transmitting, by the terminal device, data on the second type carrier M according to a transmission parameter corresponding to the first type carrier system U and on the second type carrier N according to a transmission parameter corresponding to the first type carrier system V, includes:

determining, by the terminal device, that it is neither within the coverage of the first type carrier system U, nor within the coverage of the first type carrier system V;

transmitting, by the terminal device, data on the second type carrier M and on the second type carrier N according to a pre-configured transmission parameter for the second type carrier; or, transmitting, by the terminal device, data on the second type carrier M according to a pre-configured transmission parameter for the second type carrier M and data on the second type carrier N according to a pre-configured transmission parameter for the second type carrier N.

In an implementation form of the first aspect, the transmitting, by the terminal device, data on the second type carrier M according to a transmission parameter corresponding to the first type carrier system U and data on the second type carrier N according to a transmission parameter corresponding to the first type carrier system V, includes:

determining, by the terminal device, that it is within both the coverage of the first type carrier system U and the coverage of the first type carrier system V;

transmitting, by the terminal device, data on the second type carrier M according to the transmission parameter corresponding to the first type carrier system U and on the second type carrier N according to the transmission parameter corresponding to the first type carrier system V.

In an implementation form of the first aspect, the at least one second type carrier includes a second type carrier M, the at least one first type carrier system includes a first type carrier system U and a first type carrier system V, and the second type carrier M corresponds to the first type carrier system U and the first type carrier system V;

the determining, by a terminal device, according to configuration information, to transmit data on at least one second type carrier according to a transmission parameter corresponding to at least one first type carrier system, includes:

transmitting, by the terminal device, data on the second type carrier M according to a transmission parameter corresponding to the first type carrier system U.

In an implementation form of the first aspect, the method further includes:

determining, by the terminal device, according to at least one of PLMN information, RAT information, or geographic location information, whether it is within coverage of the first type carrier system U and whether it is within coverage of the first type carrier system V.

In an implementation form of the first aspect, the transmitting, by the terminal device, data on the second type carrier M according to a transmission parameter corresponding to the first type carrier system U, includes:

determining, by the terminal device, that it is within coverage of the first type carrier system U and is not within coverage of the first type carrier system V.

In an implementation form of the first aspect, the transmitting, by the terminal device, data on the second type carrier M according to a transmission parameter corresponding to the first type carrier system U, includes:

determining, by the terminal device, that it is within both coverage of the first type carrier system U and coverage of the first type carrier system V.

In an implementation form of the first aspect, the method further includes:

selecting, by the terminal device, the first type carrier system U according to first indication information.

In an implementation form of the first aspect, the first indication information is carried in the configuration information.

In an implementation form of the first aspect, the first indication information is configured by a network device.

In an implementation form of the first aspect, the method further includes:

if the first type carrier system U and the first type carrier system V belonging to different network devices, determining, by the terminal device, the first indication information through signaling interaction between the network devices.

In an implementation form of the first aspect, the first type carrier system U corresponds to a first network device, and the first type carrier system V corresponds to a second network device, the determining, by the terminal device, the first indication information according to signaling interaction between the network devices, includes:

receiving, by the terminal device, a first message sent by the first network device or the second network device, and the first message is configured to determine the first indication information, where the first message is determined through signaling interaction between the first network device and the second network device;

determining, by the terminal device, the first indication information according to the first message.

In an implementation form of the first aspect, the terminal device is an access layer of the terminal device, and before determining, by the terminal device, according to the configuration information, to transmit data on the at least one second type carrier according to the transmission parameter corresponding to the at least one first type carrier system, the method further includes:

receiving, by the access layer of the terminal device, the configuration information from a higher layer of the terminal device.

In an implementation form of the first aspect, before determining, by the terminal device, according to the configuration information, to transmit data on the at least one second type carrier according to the transmission parameter corresponding to the at least one first type carrier system, the method further includes:

receiving, by the terminal device, the configuration information from the network device.

In a second aspect, the present application provides a wireless communication method that is applied to device to device communication, where the method includes:

transmitting, by the network device, configuration information to a terminal device, to enable the terminal device to determine, according to the configuration information, to transmit data on at least one second type carrier according to a transmission parameter corresponding to at least one first type carrier system, where, the configuration information indicates a correspondence between the at least one second type carrier and the at least one first type carrier system, a first type carrier is configured to transmit the transmission parameter over downlink, and the second type carrier is configured to transmit data over sidelink.

Therefore, in the wireless communication method in the embodiment of the present application, the network device configures the configuration information that indicates the correspondence between the at least one second type carrier and the at least one first type carrier system, so that the terminal device may determine to transmit data on the at least one second type carrier according to the transmission parameter corresponding to the at least one first type carrier system, thereby saving resources and reducing signaling overhead.

In an implementation form of the second aspect, an attribute of the first type carrier system includes the at least one first type carrier.

In an implementation form of the second aspect, the attribute of the first type carrier system further includes at least one of PLMN information, RAT information, or geographic location information.

In an implementation form of the second aspect, the RAT information is for an LTE communication network, or for a 5G NR communication network.

In an implementation form of the second aspect, the at least one second type carrier includes a second type carrier M, the at least one first type carrier system includes a first type carrier system U and a first type carrier V, and the second type carrier M corresponds to the first type carrier system U and the first type carrier V, where the terminal device transmits data on the at least one second type carrier M according to a transmission parameter corresponding to the at least one first type carrier system U.

In an implementation form of the second aspect, the first type carrier system U is determined by the terminal device according to first indication information.

In an implementation form of the second aspect, the method further includes:

transmitting, by the network device, the first indication information to the terminal device.

In an implementation form of the second aspect, the first indication information is carried in the configuration information.

In an implementation form of the second aspect, the first type carrier system U corresponds to the first network device, and the first type carrier system V corresponds to the second network device, and the method further includes:

receiving, by the first network device, first signaling transmitted by the second network device to determine the first type carrier system U.

In an implementation form of the second aspect, the first type carrier system U corresponds to the first network device, and the first type carrier system V corresponds to the second network device, and the method further includes:

transmitting, by the first network device, to the second network device, second signaling for determining the first type carrier system U.

In an implementation form of the second aspect, the first type carrier system U corresponds to the first network device, and the first type carrier system V corresponds to the second network device, and the method further includes:

transmitting, by the first network device or the second network device, a first message to the terminal device, where the first message is configured to determine the first indication information.

In a third aspect, a terminal device is provided to execute the method according to both the first aspect and various implementation forms of the first aspect.

Specifically, the terminal device includes a functional module for executing the method according to the first aspect or the method according to implementation forms of the first aspect.

In a fourth aspect, a network device is provided to execute the method according to both the second aspect and various implementation forms of the second aspect.

Specifically, the network device includes a functional module for executing the method according to the second aspect or the method according to various implementation forms of the second aspect.

In a fifth aspect, a terminal device is provided, including a processor and a memory. The memory is used to store a computer program, and the processor is used to call and run the computer program stored in the memory, so as to execute the method according to the first aspect or the method according to various implementation forms of the first aspect.

In a sixth aspect, a network device is provided, including a processor and a memory. The memory is used to store a computer program, and the processor is used to call and run the computer program stored in the memory, so as to execute the method according to the second aspect or the method according to various implementation forms of the second aspect.

In a seventh aspect, a chip is provided to implement the method according to any one of the first aspect to the second aspect or the method according to various implementation forms thereof of any one of the first aspect to the second aspect.

Specifically, the chip includes a processor for calling and running a computer program from a memory, so that a device installed with the chip executes the method according to any one of the first aspect to the second aspect or the method according to various implementation forms of any one of the first aspect to the second aspect.

In an eighth aspect, a computer-readable storage medium is provided for storing a computer program that causes a computer to execute the method in any one of the first aspect to the second aspect described above or the method according to various implementation forms of any one of the first aspect to the second aspect.

In a ninth aspect, a computer program product is provided, including computer program instructions that cause a computer to execute the method according to any one of the first aspect to the second aspect described above or the method according to various implementation forms of any one of the first aspect to the second aspect.

In a tenth aspect, a computer program is provided that, when run on a computer, causes a computer to execute the method according to any one of the first aspect to the second aspect described above or the method according to various implementation forms of any one of the first aspect to the second aspect.

DESCRIPTION OF EMBODIMENTS

A clear and complete description of the technical solution in an embodiment of the present application will be provided below in conjunction with the accompanying drawings.

It should be understood that the technical solution of the embodiments of the present application may be applied to a device to device (D2D) communication system, for example, an internet of vehicle system for D2D communication based on long term evolution (LTE). Different from the traditional LTE system, in which communication data between terminals is received or transmitted through the network device (for example, a base station), the internet of vehicle system adopts a device to device direct communication mode, so it has higher spectrum efficiency and lower transmission delay.

In an embodiment, the internet of vehicle system on which the communication system is based may be a global system of mobile communication (GSM) system, a code division multiple access (CDMA) system, a wideband code division multiple access (WCDMA) system, a general packet radio service (GPRS), an LTE system, an LTE frequency division duplex (FDD) system, an LTE time division duplex (TDD), a universal mobile telecommunication system (UMTS), a worldwide interoperability for microwave access (WiMAX) communication system, 5G new radio (NR) system, etc.

The terminal device in the embodiment of the present application may be a terminal device capable of implementing the D2D communication. For example, the terminal device may be an in-vehicle terminal device, a terminal device in a 5G network, or a terminal device in a public land mobile network (PLMN), which are not limited in embodiments of the present application.

Figure 1:
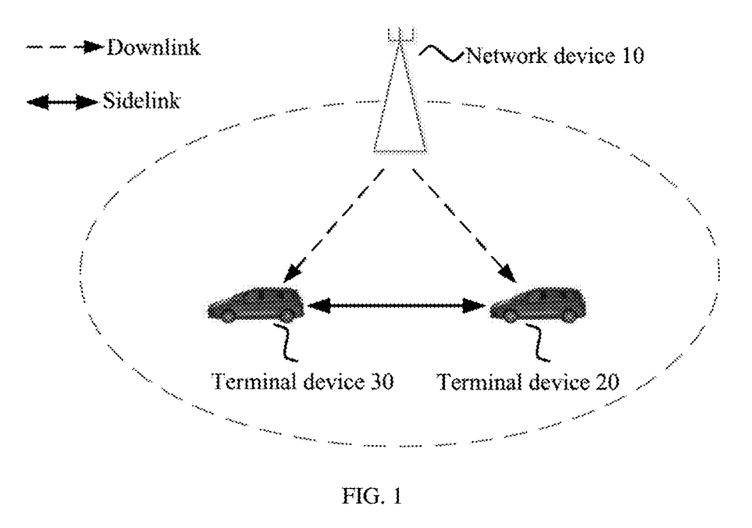
FIG. 1 is a schematic diagram of an application scenario according to an embodiment of the present application.
Figure 2:
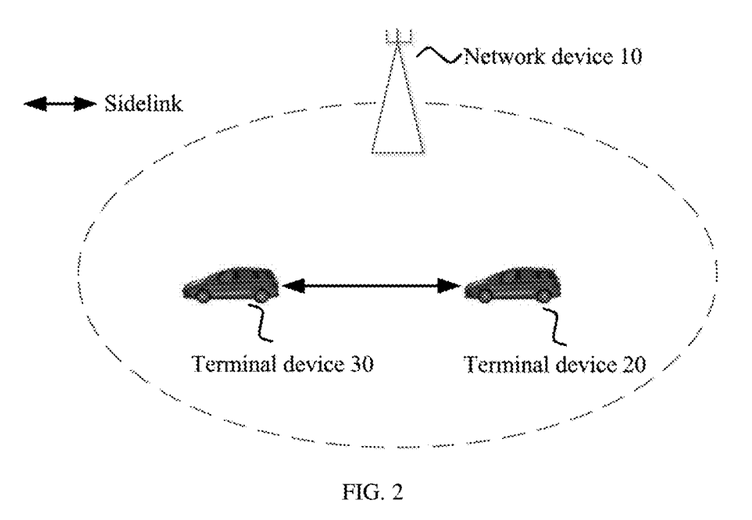
FIG. 2 is a schematic diagram of another application scenario according to an embodiment of the present application.

FIG. 1 and FIG. 2 are schematic diagrams of application scenarios according to the embodiment of the present application. FIG. 1 exemplarily shows one network device and two terminal devices. In an embodiment, the wireless communication system in the embodiment of the present application may include multiple network devices and the coverage of each network device may include other numbers of terminal devices, which are not limited in the embodiments of the present application.

In an embodiment, the wireless communication system may further include other network entities, such as a mobile management entity (MME), a serving gateway (S-GW), a packet data network gateway (P-GW); or, the wireless communication system may further include other network entities such as a session management function (SMF), a unified data management (UDM), a authentication server function (AUSF), which are not limited in the embodiments of the present application.

Specifically, the terminal device 20 and the terminal device 30 can communicate through a D2D communication mode. During the D2D communication, the terminal device 20 and the terminal device 30 directly communicate through a D2D link, that is, a sidelink (SL). For example, as shown in FIG. 1 or FIG. 2, the terminal device 20 and the terminal device 30 directly communicate through a sidelink. In FIG. 1, the terminal device 20 and the terminal device 30 communicate through a sidelink, and the transmission resources thereof are allocated by the network device; In FIG. 2, the terminal device 20 and the terminal device 30 communicate through a sidelink, and the transmission resources are independently selected by the terminal device, and no network device is required to allocate transmission resources.

D2D communication can refer to the Vehicle to Vehicle (V2V) communication or the Vehicle to Everything (V2X) communication. In the V2X communication, X can refer to any device with wireless reception and transmission capabilities, for example, but not limited to, slow-moving wireless devices, fast-moving vehicle-mounted devices, or network control nodes with wireless reception and transmission capabilities. It should be understood that the embodiments of the present invention are mainly applied to the scenario of V2X communication, but can also be applied to any other D2D communication scenario, which are not limited in the embodiments of the present application.

In the internet of vehicle system, there can be two types of terminal devices, namely, the terminal device with an interception capability, such as Vehicle User Equipment (VUE) or Pedestrian User Equipment (PUE), and the terminal device without the interception capability, such as PUE. VUE has higher processing power and is usually powered by batteries in the vehicle, while PUE has low processing power, and the reduction of power consumption is also a major factor to be considered in PUE. Therefore, in the existing internet of vehicle system, VUE is considered to have complete receiving and interception capabilities, while PUE is considered to have partial or no receiving and interception capabilities. If PUE has partial interception capability, its resources can be selected using a similar interception method as VUE, so as to select available resources on the part of resources that can be intercepted. If PUE does not have the interception capability, it randomly selects transmission resources in the resource pool.

In addition, various aspects or features of the present application may be implemented as methods, devices or article of manufacture using standard programming and/or engineering techniques. The term "article of manufacture" as used in the present application covers computer programs accessible from any computer-readable device, carrier or medium. For example, computer readable medium can include, but are not limited to: magnetic storage devices (for example, hard disks, floppy disks, or magnetic tapes, etc.), optical disks (for example, Compact Discs (CDs), Digital Versatile Discs (DVDs) etc.), smart cards and flash memory devices (for example, Erasable Programmable Read-Only Memory (EPROM), cards, sticks or key drives, etc.). In addition, the various storage media described herein may represent one or more devices and/or other machine-readable media used to store information. The term "machine-readable medium" may include, but is not limited to, various media capable of storing, containing, and/or carrying the instruction and/or data.

It should be understood that terms "system" and "network" are used interchangeably herein. The term "and/or" is only used to describe an association relationship of associated objects, indicating that there can be three kinds of relationships: A exists alone, A and B exist simultaneously, and B exists alone. In addition, the character "/" used herein generally indicates that the associated objects are of an "or" relationship.

Figure 3:
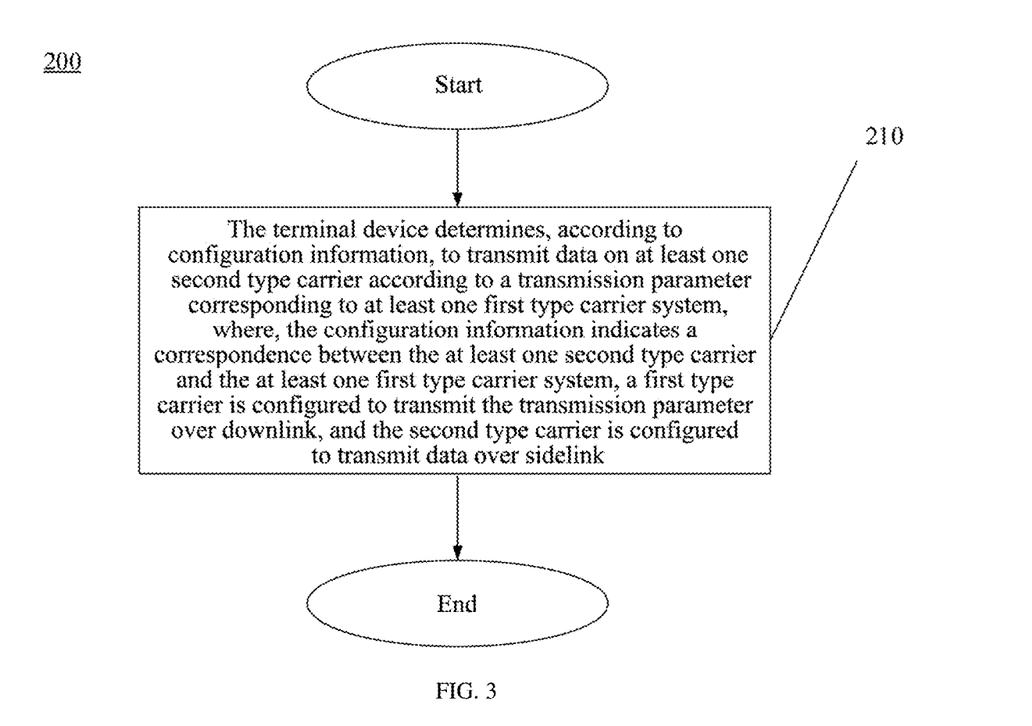
FIG. 3 is a schematic flowchart of a wireless communication method according to an embodiment of the present application.

FIG. 3 is a schematic flowchart of a wireless communication method 200 according to an embodiment of the present application. As shown in FIG. 3, the method 200 is applied to device to device communication. The method 200 can be executed by a terminal device, which can be the terminal device shown in FIG. 1 or FIG. 2. The method 200 includes the following.

210, the terminal device determines, according to configuration information, to transmit data on at least one second type carrier according to a transmission parameter corresponding to at least one first type carrier system, where, the configuration information indicates a correspondence between the at least one second type carrier and the at least one first type carrier system, a first type carrier is configured to transmit the transmission parameter over downlink, and the second type carrier is configured to transmit data over sidelink.

In an embodiment, the first type carrier may be a Uu carrier, and the second type carrier may be a PC5 carrier.

In an embodiment, the transmission parameter may be a time-frequency resource parameter, an air interface parameter, or a beam parameter, which is not limited in the embodiment of the present application.

In an embodiment, an attribute of the first type carrier system includes the at least one first type carrier.

For example, Uu carrier 1 and Uu carrier 2 both belong to Uu carrier system a.

In an embodiment, the attribute of the first type carrier system further includes at least one of PLMN information, RAT information, or geographic location information.

For example, the PLMN information corresponding to the Uu carrier system a is a mobile network, and the PLMN information corresponding to the Uu carrier system b is a Unicom network.

In an embodiment, the RAT information is RAT information for a LTE communication network, or RAT information for a 5G NR communication network.

In an embodiment, terminal devices at different geographic locations correspond to different Uu carrier systems.

For example, the terminal device in China corresponds to the Uu carrier system a, while the terminal device in the United States corresponds to the Uu carrier system b.

In an embodiment, the at least one second type carrier includes a second type carrier X and a second type carrier Y, the at least one first type carrier system includes a first type carrier system Z, and the second type carrier X and the second type carrier Y correspond to the first type carrier system Z; the terminal device transmits data on the second type carrier X and the second type carrier Y according to a transmission parameter corresponding to the first type carrier system Z.

In an embodiment, the terminal device determines whether it is within the coverage of the first type carrier system Z according to at least one of the PLMN information, RAT information, or geographic location information.

Specifically, if the terminal device determines that it is within the coverage of the first type carrier system Z, the terminal device transmits data on the second type carrier X and the second type carrier Y according to the transmission parameter corresponding to the first type carrier system Z.

Specifically, if the terminal device determines that it is not within the coverage of the first type carrier system Z, the terminal device transmits data on the second type carrier X and the second type carrier Y according to a pre-configured transmission parameter for the second type carrier; or, the terminal device transmits data on the second type carrier X according to a pre-configured transmission parameter for the second type carrier X and on the second type carrier Y according to a pre-configured transmission parameter for the second type carrier Y.

That is, the transmission parameter can be pre-configured for all second type carriers or for a specific second type carrier.

In an embodiment, the at least one second type carrier includes a second type carrier M and a second type carrier N, and the at least one first type carrier system includes a first type carrier system U and a first type carrier system V, the second type carrier M corresponds to the first type carrier system U, and the second type carrier N corresponds to the first type carrier system V; the terminal device transmits data on the second type carrier M according to a transmission parameter corresponding to the first type carrier system U, and on the second type carrier N according to the transmission parameter corresponding to the first type carrier system V.

In an embodiment, the terminal device determines, according to at least one of PLMN information, RAT information, or geographic location information, whether it is within the coverage of the first type carrier system U, and whether it is within the coverage of the first type carrier system V.

In an embodiment, the terminal device determines that it is within the coverage of the first type carrier system U, and is not within the coverage of the first type carrier system V;

the terminal device transmits data on the second type carrier M according to the transmission parameter corresponding to the first type carrier system U and transmit data on the second type carrier N according to a pre-configured transmission parameter for the second type carrier; or, the terminal device transmits data on the second type carrier N according to a pre-configured transmission parameter for the second type carrier N.

That is, the transmission parameter can be preconfigured for all second type carriers or for a specific second type carrier.

In an embodiment, the terminal device determines that it is neither within the coverage of the first type carrier system U, nor within the coverage of the first type carrier system V;

the terminal device transmits data on the second type carrier M and on the second type carrier N according to a pre-configured transmission parameter for the second type carrier; or, the terminal device transmits data on both the second type carrier M according to a pre-configured transmission parameter for the second type carrier M and data on the second type carrier N according to a pre-configured transmission parameter for the second type carrier N.

The terminal device determines that it is within both the coverage of the first type carrier system U and the coverage of the first type carrier system V;

The terminal device transmits data on the second type carrier M according to the transmission parameter corresponding to the first type carrier system U and on the second type carrier N according to the transmission parameter corresponding to the first type carrier system V.

In the embodiment of the present application, the at least one second type carrier includes the second type carrier M, the at least one first type carrier system includes the first type carrier system U and the first type carrier system V, and the second type carrier M corresponds to the first type carrier system U and the first type carrier system V. At this point, the terminal device transmits on the second type carrier M according to the transmission parameter corresponding to the first type carrier system U.

Further, the terminal device determines, according to at least one of the PLMN information, the RAT information, or the geographic location information, whether it is within the coverage of the first type carrier system U and whether it is within the coverage of the first type carrier system V.

In an embodiment, the terminal device determines that it is within the coverage of the first type carrier system U and is not within the coverage of the first type carrier system V.

In an embodiment, the terminal device determines that it is within both the coverage of the first type carrier system U and the coverage of the first type carrier system V.

In an embodiment, the terminal device selects the first type carrier system U according to first indication information.

For example, the first indication information is carried in the configuration information.

As another example, the first indication information is configured by a network device.

For another example, if the first type carrier system U and the first type carrier system V belong to different network devices, the terminal device determines the first indication information according to signaling interaction between network devices.

Specifically, as an example, the first type carrier system U corresponds to a first network device, and the first type carrier system V corresponds to a second network device, the terminal device receives a first message sent by the first network device or the second network device, and the first message is configured to determine the first indication information, where the first message is determined through signaling interaction between the first network device and the second network device;

the terminal device determines the first indication information according to the first message.

It should be noted that the signaling for interactions between network devices is different from the first message.

In an embodiment, the access layer of the terminal device receives the configuration information from a higher layer of the terminal device.

In an embodiment, the configuration information may be pre-configured or may be dynamically configured at a higher layer of the terminal device.

In an embodiment, the terminal device receives the configuration information from the network device.

Therefore, in the wireless communication method in the embodiment of the present application, the terminal device, according to the configuration information indicating the correspondence between the at least one second type carrier and at least one first type carrier system, transmits data on the at least one second type carrier according to the transmission parameter corresponding to the at least one first type carrier system, thereby saving resources and reducing signaling overhead.

Figure 4:
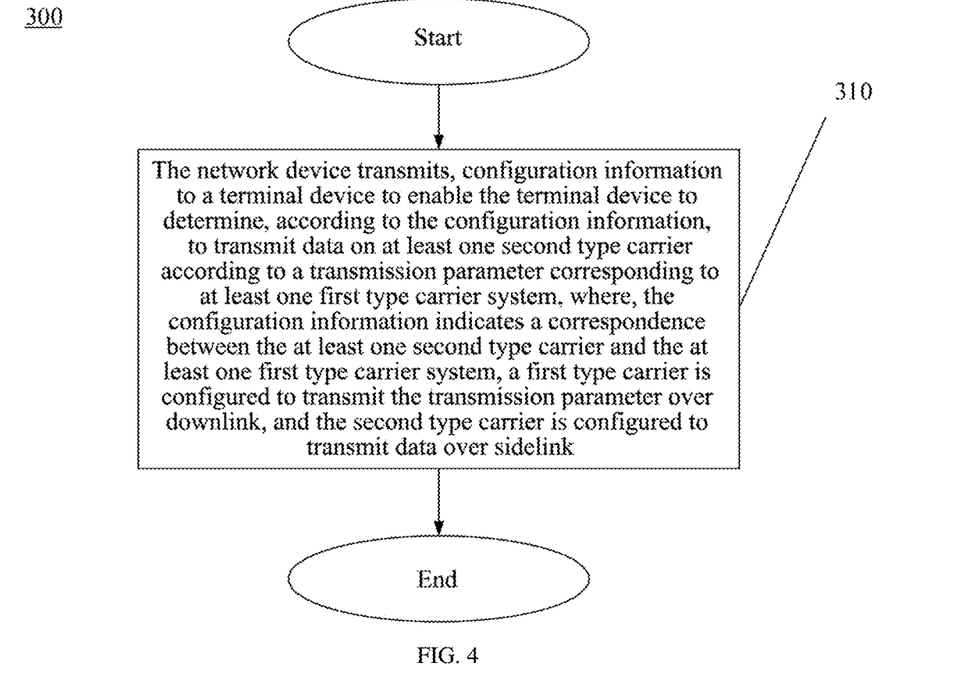
FIG. 4 is a schematic flowchart of a wireless communication method according to another embodiment of the present application.

FIG. 4 is a schematic flowchart of a wireless communication method 300 according to an embodiment of the present application. As shown in FIG. 4, the method 300 is applied to device to device communication. The method 300 can be executed by a network device, which can be the network device shown in FIG. 1. The method 300 includes the following:

310, the network device transmits configuration information to a terminal device to enable the terminal device to determine, according to the configuration information, to transmit data on at least one second type carrier according to a transmission parameter corresponding to at least one first type carrier system, where, the configuration information indicates a correspondence between the at least one second type carrier and the at least one first type carrier system, a first type carrier is configured to transmit the transmission parameter over downlink, and the second type carrier is configured to transmit data over sidelink.

In an embodiment, the first type carrier may be a Uu carrier, and the second type carrier may be a PC5 carrier.

In an embodiment, the transmission parameter may be a time-frequency resource parameter, an air interface parameter, or a beam parameter, which is not limited in the embodiment of the present application.

In an embodiment, an attribute of the first type carrier system includes the at least one first type carrier.

In an embodiment, the attribute of the first type carrier system further includes at least one of PLMN information, RAT information, or geographic location information.

In an embodiment, the RAT information is for a LTE communication network, or for a 5G NR communication network.

In the embodiment of the present application, the at least one second type carrier includes a second type carrier M, the at least one first type carrier system includes a first type carrier system U and a first type carrier system V, and the second type carrier M corresponds to the first type carrier system U and the first type carrier system V, where the terminal device transmits data on the second type carrier M according to a transmission parameter corresponding to the first type carrier system U.

In an embodiment, the first type carrier system U is determined by the terminal device according to first indication information.

In an embodiment, the first indication information is transmitted by the network device.

For example, the network device transmits the first indication information to the terminal device.

In an embodiment, the first indication information is carried in the configuration information.

In an embodiment, the first type carrier system U corresponds to a first network device, the first type carrier system V corresponds to a second network device, and the network device receives a first signaling that is transmitted by the second network device and is configured to determine the first type carrier system U.

It should be noted that this process can be understood as: the second network device actively negotiates with the first network device to determine the first type carrier system U.

In an embodiment, the first type carrier system U corresponds to the first network device, the first type carrier system V corresponds to the second network device, and the first network device transmits, to the second network device, the second signaling for determining the first type carrier system U.

It should be noted that this process can be understood as: the first network device actively negotiates with the second network device to determine the first type carrier system U.

In an embodiment, the first type carrier system U corresponds to the first network device, the first type carrier system V corresponds to the second network device, the first network device or the second network device transmits the first message to the terminal device, and the first message is configured to determine the first indication information.

Therefore, in the wireless communication method in the embodiment of the present application, the network device configures the configuration information indicating the correspondence between the at least one second type carrier and at least one first type carrier system, so that the terminal device may transmit data on the at least one second type carrier according to the transmission parameter corresponding to the at least one first type carrier system, thereby saving resources and reducing signaling overhead.

Figure 5:
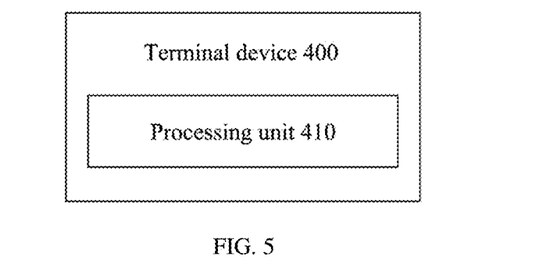
FIG. 5 is a schematic block diagram of a terminal device according to an embodiment of the present application.

FIG. 5 is a schematic block diagram of a terminal device 400 according to an embodiment of the present application. As shown in FIG. 5, the terminal device 400 is applied to device to device communication. The terminal device 400 includes:

a processing unit 410, configured to determine, according to configuration information, to transmit data on at least one second type carrier according to a transmission parameter corresponding to at least one first type carrier system, where, the configuration information indicates a correspondence between the at least one second type carrier and the at least one first type carrier system, a first type carrier is configured to transmit the transmission parameter over downlink, and the second type carrier is configured to transmit data over sidelink.

In an embodiment, an attribute of the first type carrier system include the at least one first type carrier.

In an embodiment, the attribute of the first type carrier system further includes at least one of PLMN information, RAT information, or geographic location information.

In an embodiment, the RAT information is for a LTE communication network, or for a 5G NR communication network.

In an embodiment, the at least one second type carrier includes a second type carrier X and a second type carrier Y, the at least one first type carrier system includes a first type carrier system Z, and the second type carrier X and the second type carrier Y correspond to the first type carrier system Z;

the processing unit 410 is specifically configured to:

transmit data on the second type carrier X and the second type carrier Y according to a transmission parameter corresponding to the first type carrier system Z.

In an embodiment, the processing unit 410 is further configured to determine whether the terminal device 400 is within the coverage of the first type carrier system Z according to at least one of the PLMN information, the RAT information, or the geographic location information.

In an embodiment, the processing unit 410 is specifically configured to:

determine that the terminal device 400 is within the coverage of the first type carrier system Z;

transmit data on the second type carrier X and the second type carrier Y according to the transmission parameter corresponding to the first type carrier system Z.

In an embodiment, the processing unit 410 is specifically configured to:

determine that the terminal device 400 is not within the coverage of the first type carrier system Z;

transmit data on the second type carrier X and the second type carrier Y according to a pre-configured transmission parameter for the second type carrier; or, transmit data on the second type carrier X according to a pre-configured transmission parameter for the second type carrier X and transmit data on the second type carrier Y according to a pre-configured transmission parameter for the second type carrier Y.

In an embodiment, the at least one second type carrier includes a second type carrier M and a second type carrier N, and the at least one first type carrier system includes a first type carrier system U and a first type carrier system V. The second type carrier M corresponds to the first type carrier system U, and the second type carrier N corresponds to the first type carrier system V;

the processing unit 410 is specifically configured to:

transmit data on the second type carrier M according to the transmission parameter corresponding to the first type carrier system U, and data on the second type carrier N according to the transmission parameter corresponding to the first type carrier system V.

In an embodiment, the processing unit 410 is further configured to determine, according to at least one of the PLMN information, RAT information, or geographic location information, whether the terminal device 400 is within the coverage of the first type carrier system U, and whether the terminal device 400 is within the coverage of the first type carrier system V.

In an embodiment, the processing unit 410 is specifically configured to:

determine that the terminal device 400 is within the coverage of the first type carrier system U, and is not within the coverage of the first type carrier system V;

transmit data on the second type carrier M according to the transmission parameter corresponding to the first type carrier system U and transmit data on the second type carrier N according to a pre-configured transmission parameter for the second type carrier; or, transmit data on the second type carrier N according to a pre-configured transmission parameter for the second type carrier N.

In an embodiment, the processing unit 410 is specifically configured to:

determine that the terminal device 400 is neither within the coverage of the first type carrier system U, nor within the coverage of the first type carrier system V;

transmit data on the second type carrier M and on the second type carrier N according to a pre-configured transmission parameter for the second type carrier; or, transmit data on the second type carrier M according to a pre-configured transmission parameter for the second type carrier M and data on the second type carrier N according to a pre-configured transmission parameter for the second type carrier N.

In an embodiment, the processing unit 410 is specifically configured to:

determines that the terminal device 400 is within both the coverage of the first type carrier system U and the coverage of the first type carrier system V;

transmit data on both the second type carrier M according to the transmission parameter corresponding to the first type carrier system U and the second type carrier N according to the transmission parameter corresponding to the first type carrier system V.

In an embodiment, the at least one second type carrier includes the second type carrier M, the at least one first type carrier system includes the first type carrier system U and the first type carrier system V, and the second type carrier M corresponds to the first type carrier system U and the first type carrier system V;

the processing unit 410 is specifically configured to:

transmit data on the second type carrier M according to the transmission parameter corresponding to the first type carrier system U.

In an embodiment, the processing unit 410 is further configured to determine, according to at least one of the PLMN information, RAT information, or geographic location information, whether the terminal device 400 is within the coverage of the first type carrier system U and whether the terminal device 400 is within the coverage of the first type carrier system V.

In an embodiment, the processing unit 410 is specifically configured to:

determine that the terminal device 400 is within the coverage of the first type carrier system U and is not within the coverage of the first type carrier system V.

In an embodiment, the processing unit 410 is specifically configured to:

determine that the terminal device 400 is within both the coverage of the first type carrier system U and the coverage of the first type carrier system V.

In an embodiment, the processing unit 410 is further configured to select the first type carrier system U according to first indication information.

In an embodiment, the first indication information is carried in the configuration information.

In an embodiment, the first indication information is configured by a network device.

In an embodiment, if the first type carrier system U and the first type carrier system V belong to different network devices, the processing unit 410 is further configured to determine the first indication information through signaling interaction between the network devices.

In an embodiment, the first type carrier system U corresponds to the first network device, the first type carrier system V corresponds to the second network device, and the terminal device 400 further includes:

a receiving unit 420, configured to receive a first message sent by the first network device or the second network device, and the first message is configured to determine the first indication information, where the first message is determined through signaling interaction between the first network device and the second network device;

the processing unit 410 is further configured to determine the first indication information according to the first message.

In an embodiment, the terminal device 400 is the access layer of the terminal device, the terminal device 400 further includes:

the receiving unit 420, configured to receive the configuration information from a higher layer of the terminal device before the processing unit 410 determines, according to the configuration information, to transmit data on the at least one second type carrier according to the transmission parameter corresponding to the at least one first type carrier system.

In an embodiment, the terminal device 400 further includes:

the receiving unit 420, configured to receive the configuration information from the network device before the processing unit 410 determines, according to the configuration information, determining to transmit data on the at least one second type carrier according to the transmission parameter corresponding to the at least one first type carrier system.

It should be understood that the terminal device 400 may correspond to the terminal device in the method embodiment and implement the corresponding operations implemented by the terminal device in the method embodiment, which will not be repeated herein for brevity.

Figure 6:
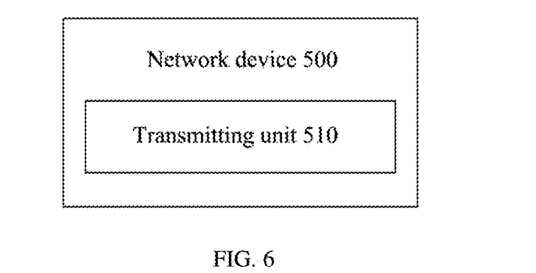
FIG. 6 is a schematic block diagram of a network device according to an embodiment of the present application.

FIG. 6 is a schematic block diagram of a network device 500 according to an embodiment of the present application. As shown in FIG. 6, the network device 500 is applied to device to device communication. The terminal device 500 includes:

a transmitting unit 510, configured to transmit configuration to the terminal device to enable the terminal device determines, according to the configuration information, to transmit data on at least one second type carrier according to a transmission parameter corresponding to at least one first type carrier system, where, the configuration information indicates a correspondence between the at least one second type carrier and the at least one first type carrier system, a first type carrier is configured to transmit the transmission parameter over downlink, and the second type carrier is configured to transmit data over sidelink.

In an embodiment, an attribute of the first type carrier system includes the at least one first type carrier.

In an embodiment, attribute of the first type carrier system further includes at least one of PLMN information, RAT information, or geographic location information.

In an embodiment, the RAT information is for an LTE communication network, or for a 5G NR communication network.

In an embodiment, the at least one second type carrier includes a second type carrier M, the at least one first type carrier system includes a first type carrier system U and a first type carrier V, and the second type carrier M corresponds to the first type carrier system U and the first type carrier V, where the terminal device transmits data on the at least one second type carrier M according to a transmission parameter corresponding to the at least one first type carrier system U.

In an embodiment, the first type carrier system U is determined by the terminal device according to first indication information.

In an embodiment, the transmitting unit is further configured to transmit the first indication information to the terminal device.

In an embodiment, the first indication information is carried in the configuration information.

In an embodiment, the first type carrier system U corresponds to the first network device, and the first type carrier system V corresponds to the second network device, the first network device includes a first receiving unit 520, where, the first receiving unit 520 is configured to receive first signaling transmitted by the second network device to determine the first type carrier system U.

In an embodiment, the first type carrier system U corresponds to the first network device, and the first type carrier system V corresponds to the second network device, the first network device includes a first transmitting unit 530, where, the first transmitting unit 530 transmits second signaling to the second network device to determine the first type carrier system U.

In an embodiment, the first type carrier system U corresponds to the first network device, and the first type carrier system V corresponds to the second network device, the first network device includes a second transmitting unit 540, the second network device includes a third transmitting unit 550, where, the second transmitting unit 540 or the third transmitting unit 550 transmits a first message to the terminal device, where the first message is used to determine the first indication information.

It should be understood that the network device 500 may correspond to the network device in the method embodiment and implement the corresponding operations implemented by the network device in the method embodiment, which will not be repeated herein for brevity.

Figure 7:
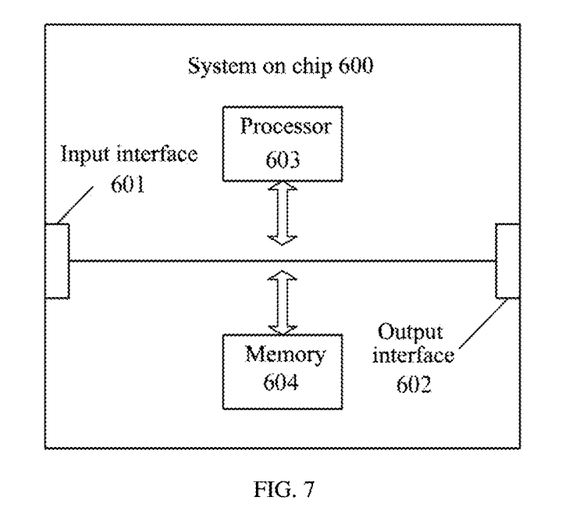
FIG. 7 is a schematic structural diagram of a system on chip according to an embodiment of the present application.

FIG. 7 is a schematic structural diagram of a system on chip 600 according to an embodiment of the present application. The system on chip 600 of FIG. 7 includes an input interface 601, an output interface 602, a processor 603 and a memory 604, which may be connected by an internal communication connection line, and the processor 603 is used to execute the code in the memory 604.

In an embodiment, when the code is executed, the processor 603 implements the method implemented by the terminal device in the method embodiment, which will not be repeated herein for brevity.

In an embodiment, when the code is executed, the processor 603 implements the method implemented by the network device in the method embodiment, which will not be repeated herein for brevity.

Figure 8:
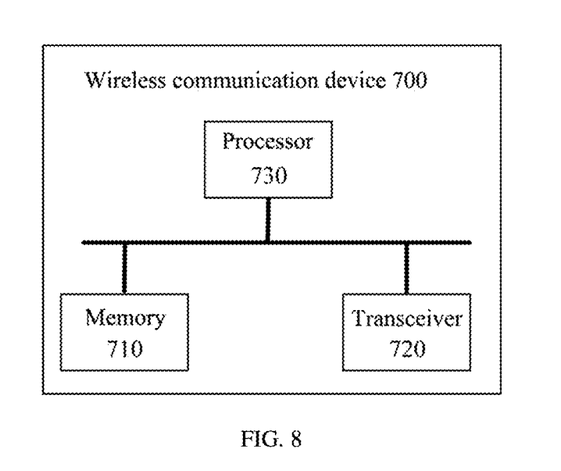
FIG. 8 illustrates a schematic block diagram of a wireless communication device according to an embodiment of the present application.

FIG. 8 illustrates a schematic block diagram of a wireless communication device 700 according to an embodiment of the present application. As shown in FIG. 8, the communication device 700 includes a processor 710 and a memory 720. The memory 720 may store the program code, and the processor 710 may execute the program code stored in the memory 720.

In an embodiment, as shown in FIG. 8, the wireless communication device 700 may include a transceiver 730, and the processor 710 may control external communication of the transceiver 730.

In an embodiment, the processor 710 may call the program code stored in the memory 720 to perform corresponding operations of the terminal device in the method embodiment, which will not be repeated herein for brevity.

In an embodiment, the processor 710 may call the program code stored in the memory 720 to perform corresponding operations of the network device in the method embodiment, which will not be repeated herein for brevity.

It should be understood that the processor of the embodiment of the present application may be an integrated circuit chip with the signal processing capability. In the implementation process, each step of the above method embodiment may be completed by an integrated logic circuit of hardware in a processor or by an instruction in software form. The above processor may be a general processor, a digital signal processor (DSP), an application specific integrated circuit (ASIC), a field programmable gate array (FPGA) or other programmable logic devices, a discrete gate or a transistor logic device, a discrete hardware component, etc. Each method, step and logic block diagram disclosed in the embodiment of the present application can be implemented or performed. The general processor may be a microprocessor, or any conventional processor or the like. Steps of the method disclosed with reference to the embodiment of the present application may be directly embodied as being performed and completed by a hardware decoding processor, or may be performed and completed by a combination of hardware and software modules in the decoding processor. The software module can be located in a mature storage medium in the art such as a random access memory, a flash memory, a read only memory, a programmable read only memory or an electrically erasable programmable memory, a registers. The storage medium is located in the memory, and the processor reads information in the memory and completes steps of the above method by combining its hardware.

It is to be understood that the memory in the embodiment of the present application may be a volatile memory or a non-volatile memory, or may include both the volatile memory and the non-volatile memory. Where the non-volatile memory may be a read-only memory (ROM), a programmable read only memory (PROM), an erasable PROM (EPROM), or an electrically EPROM (EEPROM) or a flash memory. The volatile memory may be a random access memory (RAM) that acts as an external cache. By way of example rather than limiting illustration, many forms of RAM are available, such as a static random access memory (SRAM), a dynamic random access memory (DRAM), a synchronous DRAM (SDRAM), a double data rate SDRAM (DDR SDRAM), an enhanced synchronous dynamic random access memory (ESDRAM), a Synchlink DRAM, (SLDRAM)) and a direct Rambus RAM (DR RAM). It should be noted that memories of the systems and methods described herein are intended to include, but not limited to, these and any other suitable types of memory.

Those of ordinary skill in the art will appreciate that units and algorithm steps of each example described with reference to the embodiment disclosed herein can be implemented in electronic hardware or a combination of computer software and electronic hardware. Whether these functions are executed in hardware or software depends on the specific application and design constraints of the solution. A person skilled in the art can use different methods for implementing the described functions for each specific application, but such implementation should not be considered to be beyond the scope of the present application.

A person skilled in the art can clearly understand that for convenience and brevity of the description, the specific working process of the system, the device and the unit described above may refer to corresponding processes in the above method embodiments, and will not be repeated herein.

In the several embodiments provided by the present application, it should be understood that the disclosed systems, devices, and methods may be implemented in other ways. For example, the device embodiments described above are merely illustrative. For example, the division of the unit is only a logical function division, and there may be other division ways in actual implementation, for example, multiple units or components may be combined or be integrated into another system, or some features may be ignored or not executed. In addition, coupling or direct coupling or communication connection shown or discussed herein may be an indirect coupling or communication connection through some interfaces, devices or units, and may be electrical, mechanical or otherwise.

The units described as separate components may be or may not be physically separated, and the components displayed as units may be or may not be physical units, that is, they may be located in one place, or may be distributed onto multiple network units. Some or all of the units may be selected according to actual needs for the purpose of the solution of the present embodiment.

In addition, each functional unit in each embodiment of the present application may be integrated into one processing unit, or each unit may physically exist, or two or more units may be integrated into one unit.

The functions may be stored in a computer readable storage medium if implemented in the form of a software functional unit, and sold or used as a standalone product. Based on such understanding, the technical solution of the present application, in essence, or the part contributing to the existing technology or the part of the technical solution can be embodied in the form of a software product, which is stored in a storage medium and includes instructions for enabling a computer device (which may be a personal computer, a server, or a network device, etc.) to perform all or part of the steps described in methods in each embodiment of the present application. The above storage medium includes various media that can store program code, such as a U disk, a mobile hard disk, a read-only memory (ROM), a random access memory (RAM), a magnetic disk, or an optical disk.

The above is only a specific implementation form of the present application, the scope of protection of the present application is not limited thereto, and changes or substitutions that can easily be thought of by those skilled in the art within the technical scope disclosed in the present application should be covered by the scope of protection of the present application. Therefore, the scope of protection of the present application should be subject to the scope of protection of the claims.

What is claimed is:

1. A device-to-device communication method, comprising:
   receiving, by a terminal device, configuration information from a network device, wherein the configuration information indicates a correspondence between at least one first type carrier system and at least one second type carrier, wherein the at least one first type carrier system is an uplink/downlink carrier system for device-to-network communication, and the at least one second type carrier is a sidelink carrier for device-to-device communication;
   receiving, by the terminal device, a transmission parameter corresponding to the at least one first type carrier system from the network device; and
   performing, by the terminal device, data transmission with another terminal device on the at least one second type carrier corresponding to the at least one first type carrier system according to the received transmission parameter.

2. The method according to claim 1, wherein a first type carrier system comprises at least one first type carrier.

3. The method according to claim 2, wherein information of the first type carrier system comprises at least one of public land mobile network (PLMN) information, radio access technology (RAT) information, or geographic location information.

4. The method according to claim 3, wherein the RAT information indicates a long term evolution (LTE) communication network, or a fifth generation new radio (5G NR) communication network.

5. The method according to claim 1, wherein the at least one second type carrier comprises a second type carrier X and a second type carrier Y, the at least one first type carrier system comprises a first type carrier system Z, and the second type carrier X and the second type carrier Y correspond to the first type carrier system Z; and
   wherein performing, by the terminal device, data transmission with another terminal device on the at least one second type carrier corresponding to the at least one first type carrier system according to the received transmission parameter comprises:
   performing by the terminal device, data transmission on the second type carrier X and the second type carrier Y according to a transmission parameter corresponding to the first type carrier system Z.

6. The method according to claim 1, wherein the at least one second type carrier comprises a second type carrier M and a second type carrier N, and the at least one first type carrier system comprises a first type carrier system U and a first type carrier system V, the second type carrier M corresponds to the first type carrier system U, and the second type carrier N corresponds to the first type carrier system V;
   wherein performing, by the terminal device, data transmission with another terminal device on the at least one second type carrier corresponding to the at least one first type carrier system according to the received transmission parameter comprises:
   performing, by the terminal device, data transmission on the second type carrier M according to a transmission parameter corresponding to the first type carrier system U, and/or performing, by the terminal device, data transmission on the second type carrier N according to a transmission parameter corresponding to the first type carrier system V.

7. The method according to claim 6, wherein the method further comprises:
   determining, by the terminal device, according to at least one of public land mobile network (PLMN) information, radio access technology (RAT) information, or geographic location information of the first type carrier system U and the first type carrier system V, whether the terminal device is within coverage of the first type carrier system U and whether the terminal device is within coverage of the first type carrier system V.

8. The method according to claim 7, wherein when it is determined that the terminal device is within the coverage of the first type carrier system U and not within the coverage of the first type carrier system V, performing, by the terminal device, data transmission on the second type carrier M according to the transmission parameter corresponding to the first type carrier system U, and/or performing, by the terminal device, data transmission on the second type carrier N according to the transmission parameter corresponding to the first type carrier system V comprises;
   performing, by the terminal device, data transmission on the second type carrier M according to the transmission parameter corresponding to the first type carrier system U, and performing, by the terminal device, data transmission on the second type carrier N according to a pre-configured transmission parameter for the at least one second type carrier; or, performing, by the terminal device, data transmission on the second type carrier M according to the transmission parameter corresponding to the first type carrier system U, and performing, by the terminal device, data transmission on the second type carrier N according to a pre-configured transmission parameter for the second type carrier N.

9. The method according to claim 7, wherein when it is determined that the terminal device is neither within the coverage of the first type carrier system U, nor within the coverage of the first type carrier system V, performing, by the terminal device, data transmission on the second type carrier M according to the transmission parameter corresponding to the first type carrier system U, and/or performing, by the terminal device, data transmission on the second type carrier N according to the transmission parameter corresponding to the first type carrier system V comprises:

performing, by the terminal device, data transmission on the second type carrier M and the second type carrier N according to a pre-configured transmission parameter for the at least one second type carrier; or performing, by the terminal device, data transmission on the second type carrier M according to a pre-configured transmission parameter for the second type carrier NI, and on the second type carrier N according to a pre-configured transmission parameter for the second type carrier N.

10. The method according to claim 7, wherein when it is determined that the terminal device is within both the coverage of the first type carrier system U and the coverage of the first type carrier system V, performing, by the terminal device, data transmission on the second type carrier M according to the transmission parameter corresponding to the first type carrier system U, and/or performing, by the terminal device, data transmission on the second type carrier N according to the transmission parameter corresponding to the first type carrier system V comprises:

performing the terminal device, data transmission on the second type carrier M according to the transmission parameter corresponding to the first type carrier system U and on the second type carrier N according to the transmission parameter corresponding to the first type carrier system V.

11. A terminal device, comprising a processor and a memory, wherein the memory is configured to store a computer program, which, when executed by the processor, causes the terminal device to perform the following process:

receiving configuration information from a network device, wherein the configuration information indicates a correspondence between at least one first type carrier system and at least one second type carrier, wherein the at least one first type carrier system is an uplink/downlink carrier system for device-to-network communication, and the at least one second type carrier is a sidelink carrier for device-to-device communication;

receiving a transmission parameter corresponding to the at least one first type carrier system from the network device; and performing data transmission with another terminal device on the at east one second type carrier corresponding to the at least one first type carrier system according to the received transmission parameter.

12. The terminal device according to claim 11, wherein a first type carrier system comprises at least one first type carrier.

13. The terminal device according to claim 12, wherein information of the first type carrier system comprises at least one of public land mobile network (PLMN) information, radio access technology (RAT) information, or geographic location information.

14. The terminal device according to claim 13, wherein the RAT information indicates a long term evolution (LTE) communication network, or a fifth generation new radio (5G NR) communication network.

15. The terminal device according to claim 11, wherein the at least one second type carrier comprises a second type carrier M and a second type carrier N, and the at least one first type carrier system comprises a first type carrier system U and a first type carrier system V, the second type carrier M corresponds to the first type carrier system U, and the second type carrier N corresponds to the first type carrier system V;

wherein in performing data transmission with another terminal device on the at least one second type carrier corresponding to the at least one first type carrier system according to the received transmission parameter, the computer program causes the terminal device to perform the process of:

performing data transmission on the second type carrier M according to a transmission parameter corresponding to the first type carrier system U, and/or performing data transmission on the second type carrier N according to a transmission parameter corresponding to the first type carrier system V.

16. The terminal device according to claim 15, wherein the computer program, when executed by the processor, further causes the terminal device to perform the following process:

determining, according to at least one of public land mobile network (PLAN) information, radio access technology (RAT) information, or geographic location information of the first type carrier systems, whether the terminal device is within coverage of the first type carrier system U whether tire terminal device is within coverage of the first type carrier system V.

17. The terminal device according to claim 16, wherein when it is determined that the terminal device is within the coverage of the first type carrier system U and not within the coverage of the first type carrier system V, performing data transmission on the second type carrier M according to the transmission parameter corresponding to the first type carrier system U, and/or performing, data transmission on the second type carrier N according to the transmission parameter corresponding to the first type carrier system V comprises:

performing data transmission on the second type carrier M according to the transmission parameter corresponding to the first type carrier system U, and performing data transmission on the second type carrier N according to a pre-configured transmission parameter for the at least one second type carrier; or performing data transmission on the second type carrier M according to the transmission parameter corresponding to the first type carrier system U, and performing data transmission on the second type carrier N according to a pre-configured transmission parameter for the second type carrier N.

18. The terminal device according to claim 16, wherein when it is determined that the terminal device is neither within the coverage of the first type carrier system U, nor within the coverage of the first type carrier system V, performing data transmission on the second type carrier M according to a transmission parameter corresponding to the first type carrier system U, and/or performing data transmission on the second type carrier N according to a transmission parameter corresponding to the first type carrier system V comprises:
- performing data transmission on the second type carrier M and the second type carrier N according to a pre-configured transmission parameter for the at least one second type carrier; or
- performing data transmission on the second type carrier M according to a pre-configured transmission parameter for the second type carrier M and on the second type carrier N according to a pre-configured transmission parameter for the second type carrier N.

19. A non-transitory computer-readable storage medium, configured to store a computer program that, when executed, causes a terminal device to perform a process that comprises;

receiving configuration information from a network device, wherein the configuration information indicates a correspondence between at least one first type carrier system and at least one second type carrier, wherein the at least one first type carrier system is an uplink/downlink carrier system for device-to-network communication and the at least one second type carrier is a sidelink carrier for device-to-device communication;

receiving a transmission parameter corresponding to the at least one first type carrier system from the network device; and performing data transmission with another terminal device on the at least one second type carrier corresponding to the at least one first type carrier system accord Ma to the received transmission parameter.

20. The method of claim 1, wherein the transmission parameter is a time-frequency resource parameter, an air interface parameter, or a beam parameter of the at least one first type carrier system.

* * * * *